United States Patent
Brock

(10) Patent No.: US 11,620,471 B2
(45) Date of Patent: Apr. 4, 2023

(54) CLUSTERING ANALYSIS FOR DEDUPLICATION OF TRAINING SET SAMPLES FOR MACHINE LEARNING BASED COMPUTER THREAT ANALYSIS

(71) Applicant: Cylance Inc., Irvine, CA (US)

(72) Inventor: John Brock, Irvine, CA (US)

(73) Assignee: Cylance Inc., San Ramon, CA (US)

( * ) Notice: Subject to any disclaimer, the term of this patent is extended or adjusted under 35 U.S.C. 154(b) by 1147 days.

(21) Appl. No.: 15/800,603

(22) Filed: Nov. 1, 2017

(65) Prior Publication Data

US 2018/0150724 A1 May 31, 2018

Related U.S. Application Data

(60) Provisional application No. 62/428,402, filed on Nov. 30, 2016.

(51) Int. Cl.
*G06N 20/00* (2019.01)
*G06K 9/62* (2022.01)
(Continued)

(52) U.S. Cl.
CPC ....... *G06K 9/6218* (2013.01); *G05B 13/0265* (2013.01); *G06F 21/563* (2013.01);
(Continued)

(58) Field of Classification Search
CPC .... G06K 9/6218; G06K 9/622; G06K 9/6255; G06N 20/00; G05B 13/0265; G06F 21/563; G06F 21/564
See application file for complete search history.

(56) References Cited

U.S. PATENT DOCUMENTS

| 7,461,037 B2 * | 12/2008 | Hatonen | G06K 9/6218 706/18 |
| 7,707,148 B1 * | 4/2010 | Fogel | G06K 9/6223 707/999.007 |

(Continued)

OTHER PUBLICATIONS

Hu, Xin et al., "MutantX-S: Scalable Malware Clustering Based on Static Features," 2013 USENIX Annual Technical Conference (USENIX ATC'13), Jun. 26-28, 2013, San Jose, CA (Year: 2013).*

(Continued)

*Primary Examiner* — Luis A Sitiriche
(74) *Attorney, Agent, or Firm* — Jones Day

(57) ABSTRACT

A method, a system, and a computer program product for performing analysis of data to detect presence of malicious code are disclosed. Reduced dimensionality vectors are generated from a plurality of original dimensionality vectors representing features in a plurality of samples. The reduced dimensionality vectors have a lower dimensionality than an original dimensionality of the plurality of original dimensionality vectors. A first plurality of clusters is determined by applying a first clustering algorithm to the reduced dimensionality vectors. A second plurality of clusters is determined by applying a second clustering algorithm to one or more clusters in the first plurality of clusters using the original dimensionality. An exemplar for a cluster in the second plurality of clusters is added to a training set, which is used to train a machine learning model for identifying a file containing malicious code.

14 Claims, 6 Drawing Sheets

(51) Int. Cl.
*G06F 21/56* (2013.01)
*G05B 13/02* (2006.01)
(52) U.S. Cl.
CPC ......... *G06F 21/564* (2013.01); *G06K 9/622* (2013.01); *G06K 9/6255* (2013.01); *G06N 20/00* (2019.01)

(56) References Cited

U.S. PATENT DOCUMENTS

| | | | | |
|---|---|---|---|---|
| 8,561,193 | B1* | 10/2013 | Srivastava | G06F 21/563 726/24 |
| 9,685,161 | B2* | 6/2017 | Lu | G10L 15/142 |
| 9,787,704 | B2* | 10/2017 | Danielson | H04L 67/1095 |
| 9,942,254 | B1* | 4/2018 | Averbuch | G06F 21/554 |
| 10,230,749 | B1* | 3/2019 | Rostami-Hesarsorkh | G06F 21/56 |
| 2008/0069008 | A1* | 3/2008 | Park | H04W 64/00 370/254 |
| 2010/0057773 | A1* | 3/2010 | Hore | G06Q 30/06 707/E17.046 |
| 2012/0110532 | A1* | 5/2012 | Alpert | G06F 30/392 716/114 |
| 2012/0330959 | A1* | 12/2012 | Kretz | G06Q 50/265 707/739 |
| 2013/0097704 | A1* | 4/2013 | Gavrilut | G06F 21/56 726/23 |
| 2013/0322760 | A1* | 12/2013 | Robinson | G06K 9/46 382/191 |
| 2013/0325862 | A1* | 12/2013 | Black | G06F 16/285 707/737 |
| 2015/0158489 | A1* | 6/2015 | Oh | B60W 30/09 701/41 |
| 2015/0261846 | A1* | 9/2015 | Hall | G06F 17/18 707/738 |
| 2016/0026933 | A1* | 1/2016 | Chamness | G06N 3/08 706/12 |
| 2016/0117457 | A1* | 4/2016 | Kim | G16H 50/20 706/12 |
| 2017/0017793 | A1* | 1/2017 | Davis | G06N 3/08 |
| 2017/0220499 | A1* | 8/2017 | Gray | G06F 13/36 |
| 2018/0053097 | A1* | 2/2018 | Soni et al. | G06N 5/04 5/4 |
| 2018/0115622 | A1* | 4/2018 | Zheng | H04L 51/32 |
| 2018/0144003 | A1* | 5/2018 | Formoso | G06F 16/244 |
| 2019/0199736 | A1* | 6/2019 | Howard | G06F 21/554 |
| 2020/0294128 | A1* | 9/2020 | Celia | H04L 9/3239 |
| 2020/0334637 | A1* | 10/2020 | Turner | G06Q 10/0838 |

OTHER PUBLICATIONS

Perdisci et al., "Scalable fine-grained behavioral clustering of HTTP-based malware," Computer Networks 57 (2013) pp. 487-500 (Year: 2013).*

Ramalho, Ricardo, Thesis paper "Role Based Behavior Analysis", University of Lisbon, Nov. 2009 (Year: 2009).*

Luigi Grimaudo et al., "Self-Learning Classifier for Internet Traffic," 5th IEEE International Traffic Monitoring and Analysis Workshop (TMA 2013), Torino, Italy, Apr. 18, 2013 (Year: 2013).*

"Online anomaly detection using dimensionality reduction techniques for HTTP log analysis" Juvonen et al (Year: 2015).*

* cited by examiner

CLUSTERING ANALYSIS FOR DEDUPLICATION OF TRAINING SET SAMPLES FOR MACHINE LEARNING BASED COMPUTER THREAT ANALYSIS

RELATED APPLICATION

The current applications claims priority to U.S. Pat. App. Ser. No. 62/428,402 filed on Nov. 30, 2016, the contents of which are hereby fully incorporated by referenced.

TECHNICAL FIELD

This disclosure relates generally to data processing and, in particular, to deduplication of training set samples for the purposes of machine learning in detecting computer threats.

BACKGROUND

Malicious software or malware, viruses, and other harmful software are typically used to disrupt computing operations, gather sensitive information, gain access to private computing systems, display unwanted advertising, and/or cause other unwanted interference with companies' businesses. Malware includes computer viruses, worms, Trojan horses, ransomware, spyware, adware, scareware, and any other malicious programs. It can be hidden in data that can be downloaded from websites, disguised as legitimate programs or programs known to be non-malicious, etc. and can be an executable code, scripts, active content, and/or other software.

Anti-virus, anti-malware software, firewalls, etc. are typically used to protect computing systems against malicious activity as well as perform recovery from attacks. However, conventional methods are not capable of accounting for malicious software that may have duplicated over time and/or may have mutated (e.g., changed its code insignificantly to disguise the original malicious code). Such conventional methods typically treat duplicated/mutated malicious code as entirely new malicious code, thereby making such methods inefficient in training machine learning models that may be used to identify presence of malicious code in data. In particular, conventional systems are inefficient because their model training algorithms process a significant number of similar files when learning about one file may be sufficient. Further, conventional systems typically bias the model toward files that have a lot of duplicates in the dataset. For example, if a training dataset contains one percent of ABC near-duplicates (e.g., dataset contains a lot of small mutations of the ABC malware), then the model might be overly biased toward learning about ABC malware, instead of learning about other types of malware (and/or non-malware files). Thus, the conventional models do not represent the "real world" scenarios and instead are narrowly focused. Thus, there is a need to identify presence of duplicated/mutated malicious code for the purposes of effectively and efficiently training machine learning models.

SUMMARY

In some implementations, the current subject matter relates to a computer implemented method for performing analysis of data to detect presence of malicious code. The method can include generating reduced dimensionality vectors from a plurality of original dimensionality vectors representing features in a plurality of samples. The reduced dimensionality vectors can have a lower dimensionality than an original dimensionality of the plurality of original dimensionality vectors. The method can also include a first determination of a first plurality of clusters, which can include applying a first clustering algorithm to the reduced dimensionality vectors, and a second determination of a second plurality of clusters, which can include applying a second clustering algorithm to one or more clusters of the first plurality of clusters using the original dimensionality. Further, the method includes adding an exemplar for a cluster in the second plurality of clusters to a training set, and training a machine learning model for identifying a file containing malicious code, where training includes use of the training set. At least one of the generating, the first determination, the second determination, the adding, and the training can be performed by at least one processor of at least one computing system.

In some implementations, the current subject matter can include one or more of the following optional elements. In some implementations, the first and second clustering algorithms can be the same.

In some implementations, the generation of the reduced dimensionality vectors can include applying a random projection to the original dimensionality vectors. The random projection can preserve at least one pairwise distance between at least two features of an original dimensionality vector. In some implementations, the random projection can approximately preserve pairwise distances between all points. For example, if any 2 points in the high dimensional space are selected and a distance between them is determined, and the points are projected to the lower-dimensional space and the distance between those two points is determined again, then that distance will be approximately the same as the originally measured distance. The random projection can have a predetermined size.

In some implementations, the addition of an exemplar can include selecting the exemplar corresponding to a sample contained in the cluster of the second plurality of clusters. The cluster in the second plurality of clusters can have a predetermined radius. The pairwise distances between features contained in the cluster of the second plurality of clusters can be less than the predetermined radius. This cluster can have a predetermined minimum number of samples. In some implementations, the pairwise distances between some points contained in the cluster in the second plurality of clusters can be greater than the predetermined radius. Further, a sample that falls outside of the cluster (e.g., an outlier) can be added as the exemplar to the training set. In some implementations, the exemplar can be selected based on a randomly selected point in each cluster. All outlier points can be selected for inclusion in the training set. In some implementations, the exemplar can be a point in each cluster that is particularly representative of that cluster (e.g., if the point is relatively close to the center of the cluster). In alternate implementations, for each cluster, a number of points proportional to the spread of the cluster can be selected as exemplar(s). For example, for a large cluster, a large number of points can be selected as exemplar(s). For a small cluster, fewer number of points can be selected.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

Figure 1:
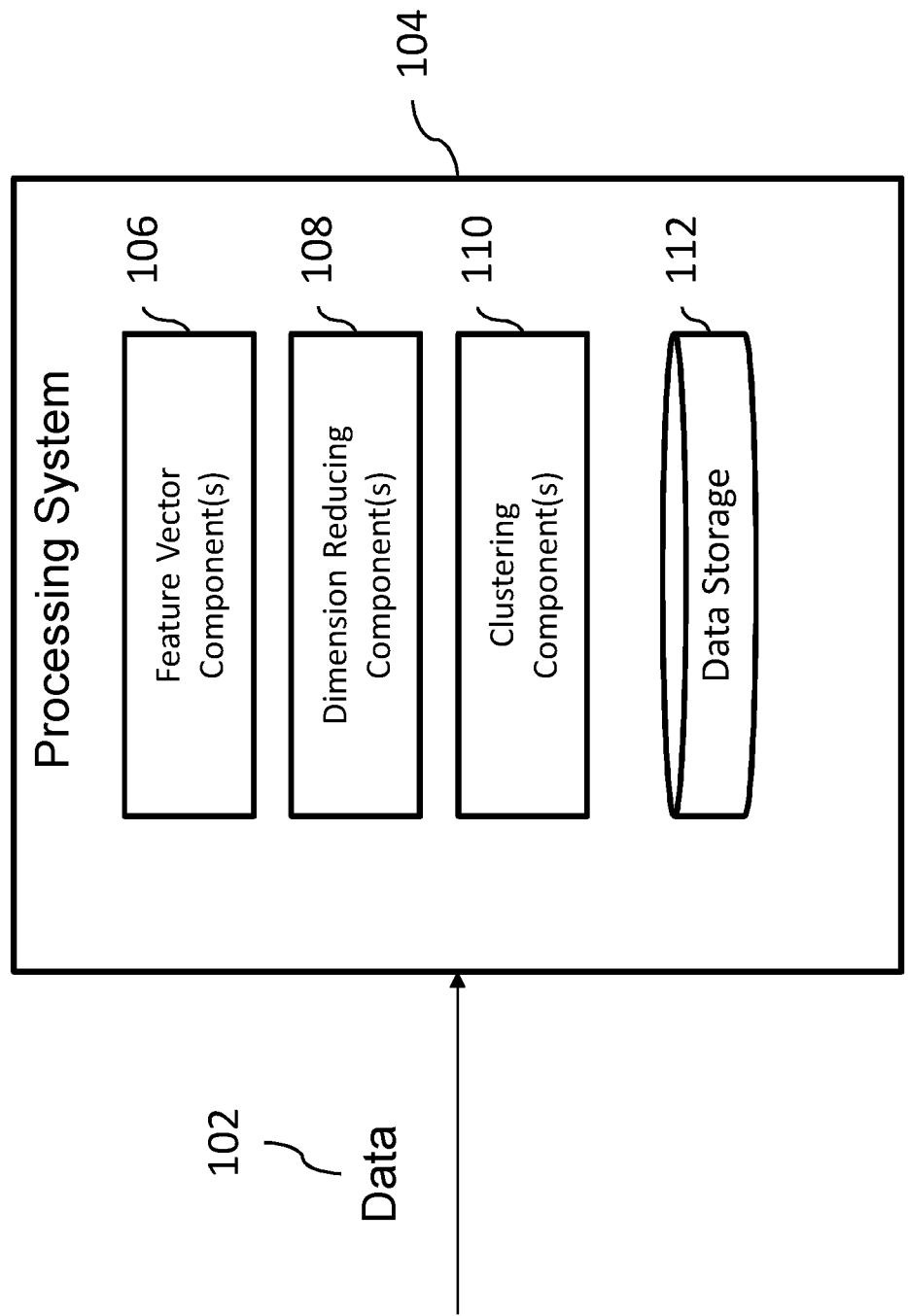
FIG. 1 illustrates an exemplary system for determination of presence of duplicates in a training dataset for the purposes of detecting existence of a malicious code, according to some implementations of the current subject matter.

In some implementations, the current subject matter relates to performing analysis of data to detect presence of malicious code. The detection can be performed using a machine learning model that can be trained using a training set. In some implementations, the current subject matter can receive a plurality of files and generate feature vectors that can be representative of each file in the plurality of files. The feature vectors can include one or more features that can be representative of the received files. In some exemplary implementations, in view of a possible large number of features, the generated feature vectors can have high dimensionality. Lower or reduced dimensionality vectors can be generated based on the original dimensionality feature vectors. In some exemplary implementations, a random projection mechanism can be applied to the original dimensionality vectors to generate the reduced dimensionality vectors and to, thereby, reduce the high dimension of the originally-generated feature vectors. One or more clustering algorithms can be applied to the reduced dimensionality vectors to determine one or more clusters of files. These clusters of files can include files that may be identical, substantially identical, similar, and/or substantially similar to each other based on the features in the files. The similarity of the files can be determined using pairwise distances falling within a predetermined distance (e.g., distances being less than a predetermined radius of the cluster). In some exemplary implementations, these clusters can be characterized by a minimum number of files. Then, clustering algorithm(s) (same and/or different) can be applied to the generated clusters using the original dimensionality corresponding to the originally-generated feature vector. This can allow further refining the clusters as well as determining files that might not be part of any cluster (which can be referred to as "outliers"). Once the clusters have been refined, a representative and/or an exemplar can be selected from each cluster for the purposes of including such exemplar in a training dataset that can be used to train a machine learning model for identifying file(s) containing a malicious code. The outlier features can serve as representatives of themselves and can be also included in the training set.

Some of the advantages of the current subject matter can include reduction of a number of duplicates or substantial duplicates that may be determined for inclusion in the training set. Such duplicates can be samples that are either identical, substantially identical, similar, and/or substantially similar, to one another. The similarity of samples can stem from having data, e.g., code, viruses, malware, etc., duplicate and/or undergo minor variations (e.g., mutate) one or more times during a period of time. The number of duplicates of the same data that can be created can be significant as the time passes by (e.g., 100s, 1000s, etc. duplicates), which can greatly consume space in the training dataset and thus, affect training of a machine learning model, as well as eventual detection of presence of malicious code. For example, duplicates can occur when authors of malware programs subtly change their malware code to avoid detection. The code can contains superficial changes and thus, can be essentially identical, thereby avoiding detection by some anti-malware detection systems. Further, some similar malware can be created using various malware tools (which can include various options that can be changed to determine what the malware does), which can allow for different pieces of the malware generated by a particular malware tool to behave/appear similar. An exemplary process for training a machine learning model is disclosed in co-owned, co-pending U.S. patent application Ser. No. 14/789,914, filed Jul. 6, 2015 and entitled "Recurrent Neural Networks for Malware Analysis" and U.S. patent application Ser. No. 15/210,761, filed Jul. 14, 2016, and entitled "Convolutional Neural Networks for Malware Analysis", the disclosures of which are incorporated herein by reference in their entireties. Additionally, multiple duplicates or near duplicates of a certain segment of code may cause weighting errors, which can cause biasing of the learning models, as discussed above. The current subject matter can determine that these duplicates are essentially the same data that can be represented by one exemplar, which can be included in the training dataset.

FIG. 1 illustrates an exemplary system 100 for determination of presence of duplicates in a training dataset for the purposes of detecting existence of a malicious code, according to some implementations of the current subject matter. The system 100 can include a processing system 104, which can include feature vector component(s) 106, dimension reducing component(s) 108, clustering component(s) 110, and a data storage component 112. The data 102 can be any data, programs, functions, etc. that can be received by the processing system 104. The data 102 can be received by the processing system 104 via a communications network, e.g., an Internet, an intranet, an extranet, a local area network ("LAN"), a wide area network ("WAN"), a metropolitan area network ("MAN"), a virtual local area network ("VLAN"), and/or any other network. The data 102 can be received via a wireless, a wired, and/or any other type of connection. The processing system 104 can be implemented using software, hardware and/or any combination of both. The system 104 can also be implemented in a personal computer, a laptop, a server, a mobile telephone, a smartphone, a tablet, and/or any other type of device and/or any combination of devices. The component(s) 106-112 can be separate components and/or can be integrated into one or more single computing components.

The feature vector component(s) 106 can perform analysis of the data 102 and generate one or more original or high dimensionality vectors to represent the data 102. For example, each file and/or a portion of a file in the data 102 can be represented as a vector. The feature vectors can be n-dimensional vectors containing numerical features representative one or more samples of data. For example, for an image, the features can correspond to pixels of the image; for a text, the features can correspond to terms/number of times a term has occurred in the text; etc. In view of a potentially large number of features contained in the data samples, the generated feature vectors can have a high dimension. To reduce dimensionality of the feature vectors, dimension reducing component(s) 108 can be used.

The dimension reducing component(s) 108 can reduce dimensionality of the vectors to generate reduced-dimensionality vectors of features. In some exemplary implementations, the dimension reducing component(s) 108 can use random projection and/or any other dimension reducing technique to reduce dimension of the original feature vector. Application of the random projection can preserve one or more pairwise distances between features/elements contained in the original high-dimension feature vectors. For example, an original feature space, as represented by the original high-dimensionality feature vector(s), can have a significant number of features (e.g., millions), e.g., can have an N-dimension. Random projection can generate reduced-dimensionality or low-dimensionality vector(s) having an M-dimension, where $M \ll N$. The dimension of the reduced-dimensionality vector(s) can be selected to ensure that the generated vectors adequately represent the files/portions of files in the data 102.

Figure 2A:
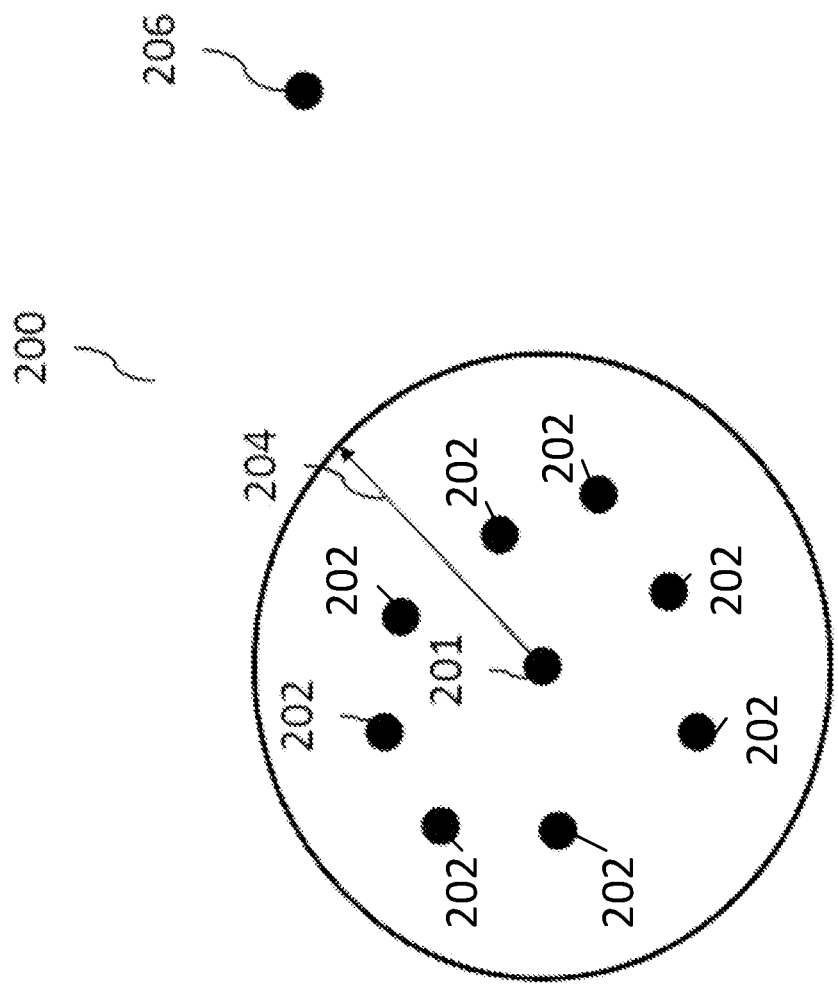
FIG. 2a illustrates an exemplary cluster, according to some implementations of the current subject matter.

Once the reduced-dimensionality vector(s) are computed, the clustering component 110 can apply a clustering algorithm to the reduced-dimensionality vector(s) to generate one or more clusters of features (as shown, for example, in FIG. 2a). A clustering algorithm can perform a cluster analysis of the vector(s) by grouping a set of features in such a way that samples in the same group (i.e., a cluster) are more similar to each other than to those in other clusters. The samples can be clustered based a particular distance between samples, where upon the distance being less than a predetermined radius, $\varepsilon$, of the cluster. Clustering algorithms can be used in exploratory data mining, statistical data analysis, machine learning, pattern recognition, image analysis, information retrieval, bioinformatics, data compression, computer graphics, etc.

Some examples of clustering algorithms can include density-based spatial clustering of applications with noise ("DBSCAN") clustering algorithm. The DBSCAN algorithm groups together points that are closely packed together in a set of points in some space. The points can be classified as core points, directly-reachable points and outliers. A point is a core point if at least a minimum number of points are within distance $\varepsilon$ (i.e., a maximum radius of a neighborhood from the core point) from the point, where such points are directly reachable from the core point. No points are directly reachable from a non-core point. A point is reachable from the core point, if there exists a path of core points ($a_1$, $a_2$, ... $a_N$), where each point in the path is directly reachable from the point immediately preceding it, where $a_1$ being the original core point and $a_N$ is the last point (which might not be directly reachable from $a_1$). Points that are not reachable from any other points are outliers.

FIG. 2a illustrates an exemplary cluster 200, according to some implementations of the current subject matter. Cluster 200 can contain a plurality of points or samples 202 and can be bound by a predetermined radius, $\varepsilon$, 204. In some exemplary implementations, the cluster 200 can have a predetermined minimum number of points 202. In some implementations, the minimum number of points can be experimentally determined. For example, based on various values of $\varepsilon$, a histogram of pairwise distances between points can be generated. Using the histogram, a value of $\varepsilon$ less than a major of the pairwise distances can be selected. The selection of $\varepsilon$ can be based on how "similar" the files should b, e.g., smaller values of $\varepsilon$ can result in more clusters with fewer members, thereby each cluster can be more internally similar, whereas higher values of $\varepsilon$ can result in larger clusters with more members per cluster. Referring back to FIG. 2, each point 202 in the cluster can be a core point that can be reachable from the core point 201. For example, the points can be related to one another, where one point can be a sample and another point can be a duplicate of that sample and/or a modified version of that sample (e.g., one point can include the same feature value as another point, and/or another point can include a similar feature value). If there are any points 204 that do not meet the criteria to be in the cluster 200, such points can be considered as outliers and, thus, are not included in the cluster. For example, point 206 is an outlier and thus is not included in cluster 200. The outlier points can be included in another cluster.

Referring back to FIG. 1, the clustering component(s)'s 110 application of the clustering algorithm to the reduced-dimensionality vector(s) can approximately preserve the original pairwise distances between features of the original-dimensionality feature vector(s). Thus, after application of the clustering algorithm to the reduced-dimensionality vector(s), if two features and/or points are in different clusters, it is likely that these two features will be in different clusters in the original-dimensionality feature vector(s). For example, in the event random projection is used for generating reduced-dimensionality vector(s), the result of application of the clustering algorithm can be similar prior to application of the random projection and after application of random projection because the pairwise distances between points are similar prior to and after application of random projection.

Figure 2B:
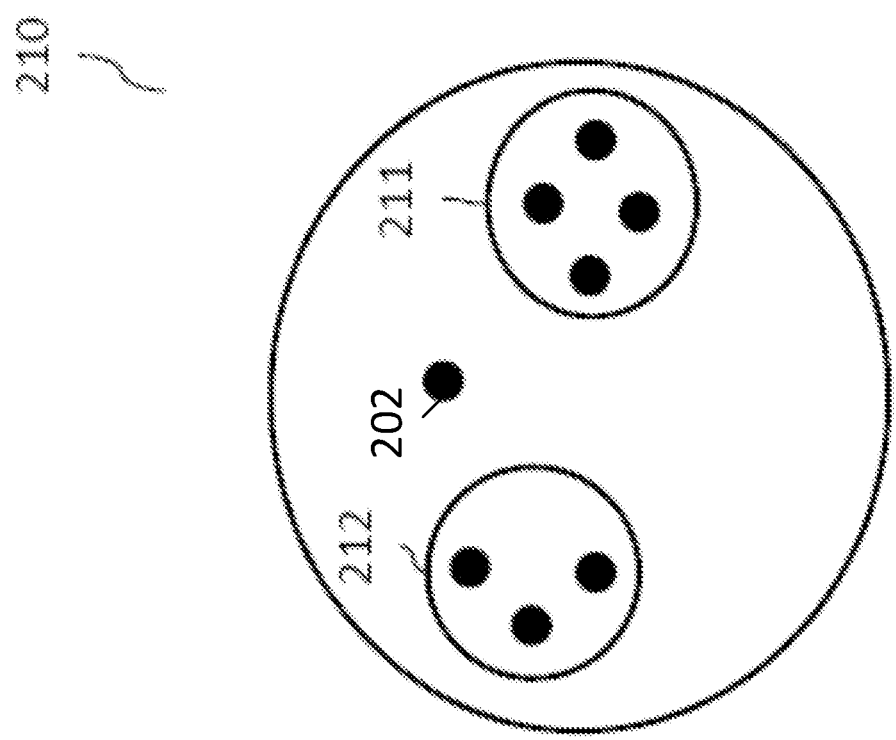
FIG. 2b illustrates an exemplary cluster after application of the clustering algorithm, according to some implementations of the current subject matter.

Once the clustering component(s)'s 110 has applied the clustering algorithm to the reduced-dimensionality vector(s) to generate one or more clusters of features, the cluster component(s) 110 can apply the clustering algorithm (which can be the same or a different clustering algorithm) to the identified clusters (e.g., cluster 200 shown in FIG. 2a) using the original-dimensionality of the original feature vector(s). This can further refine the generated clusters and determine a refined or a second set of clusters. In some implementations, performing the clustering algorithm at higher dimensions on the generated clusters can result in a cluster having a plurality of smaller clusters. FIG. 2b illustrates an exemplary cluster 210, after application of the clustering algorithm to the original cluster 200 shown in FIG. 2a. The cluster 210 can include smaller clusters 211 and 212 that can include one or more features. Application of the same clustering algorithm to the original clusters (e.g., cluster 200 shown in FIG. 2a) can re-cluster such clusters to form smaller clusters and thereby, refine the set samples from which an exemplar for inclusion in a training set can be selected.

Based on the application of the clustering algorithms, a specific representative or an exemplar can be selected from each refined cluster to serve as a representative of one or more files contained in the data. In some implementations, an exemplar can be selected for a plurality of clusters. The selection of an exemplary can be performed at random, in a predetermined fashion, based on date of creation, etc. In some implementations, an outlier point that has not been included in a cluster can serve as its own representative. The selected exemplar can be used for inclusion in a training dataset that can be used for performing training of a machine learning model for the purposes of identifying presence of a malicious code in the data 102. The data storage component 112 can be used for storage of data processed by the system 104 and can include any type of memory, e.g., a temporary memory, a permanent memory, and/or any other type of memory and/or any combination thereof.

Figure 3:
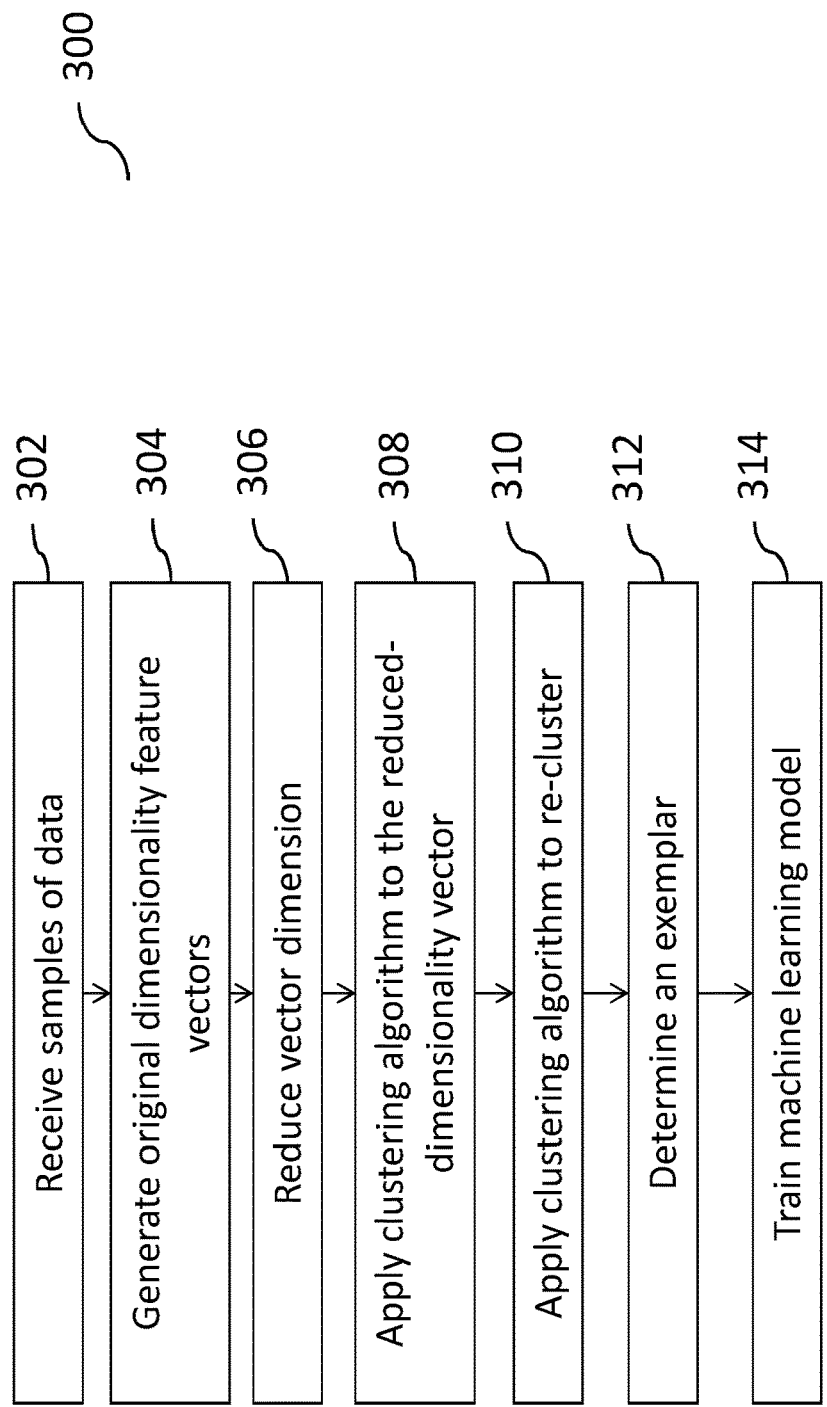
FIG. 3 illustrates an exemplary process for determination of presence of duplicates in a training dataset for the purposes of detecting existence of a malicious code, according to some implementations of the current subject matter.

FIG. 3 illustrates an exemplary process 300 for determination of presence of duplicates in a training dataset for the purposes of detecting existence of a malicious code, according to some implementations of the current subject matter. The process 300 can be performed by system 100 (as shown in FIG. 1). At 302, samples of data can be received at a processing node (e.g., processing system 104 shown in FIG. 1). The samples of data can include files, portions of files, etc. At 304, feature vectors, having an original or high dimension, can be generated based on the received data. For example, each file/portion of a file can be represented as a vector of elements, where each element in the vector can correspond to a specific feature of data.

At 306, a dimension reduction (e.g., random projection) can be applied to the generated feature vectors to project the feature space into a reduced dimension space, and to generate reduced-dimensionality vector(s). The size/dimension of the resulting reduced-dimensionality vector(s) can be predetermined prior to the application of the dimension reduction techniques. In some implementations, the dimension can be experimentally determined. Having a small size of the reduced-dimensionality vector(s) can result in a greater number of samples appearing as duplicates of one another. Conversely, having a large size of the reduced-dimensionality vector(s) can result in a smaller number of samples (or no samples) appearing as duplicates of one another. Both may make it difficult to identify samples that are similar and/or identical (and/or substantially similar and/or substantially identical) to one another.

At 308, a clustering algorithm can be applied to the reduced-dimensionality vector(s) to generate one or more clusters of points, where each point can contain a feature in the original feature vector(s). As stated above, the points in the clusters can be either core points or directly reachable from the core points. Points that are not reachable are considered outliers and thus, are not included in the clusters. The cluster(s) can include points, whose pairwise distances have been approximately preserved from the original (i.e., prior to the application of dimension reduction techniques and hence, being larger) feature vector.

At 310, the clustering algorithm (same or different one) can be applied, using the original (higher) dimensionality of the original feature vector(s), to the cluster(s) identified based on the initial application of the clustering algorithm to the reduced-dimensionality vector(s) at 308. The result of the second application of the clustering algorithm can generate one or more smaller clusters (e.g., clusters 211 and 212 as shown in FIG. 2b).

At 312, a representative or an exemplar of each smaller cluster (alternatively, the exemplar can represent a plurality of small clusters) can be selected for the purposes of generating a training dataset. The exemplar can be used to exclude data samples that appear identical, similar, substantially identical and/or substantially similar. At 314, the generated dataset can be used for training a machine learning model for the purposes of identifying presence of malicious code in the data.

Figure 4:
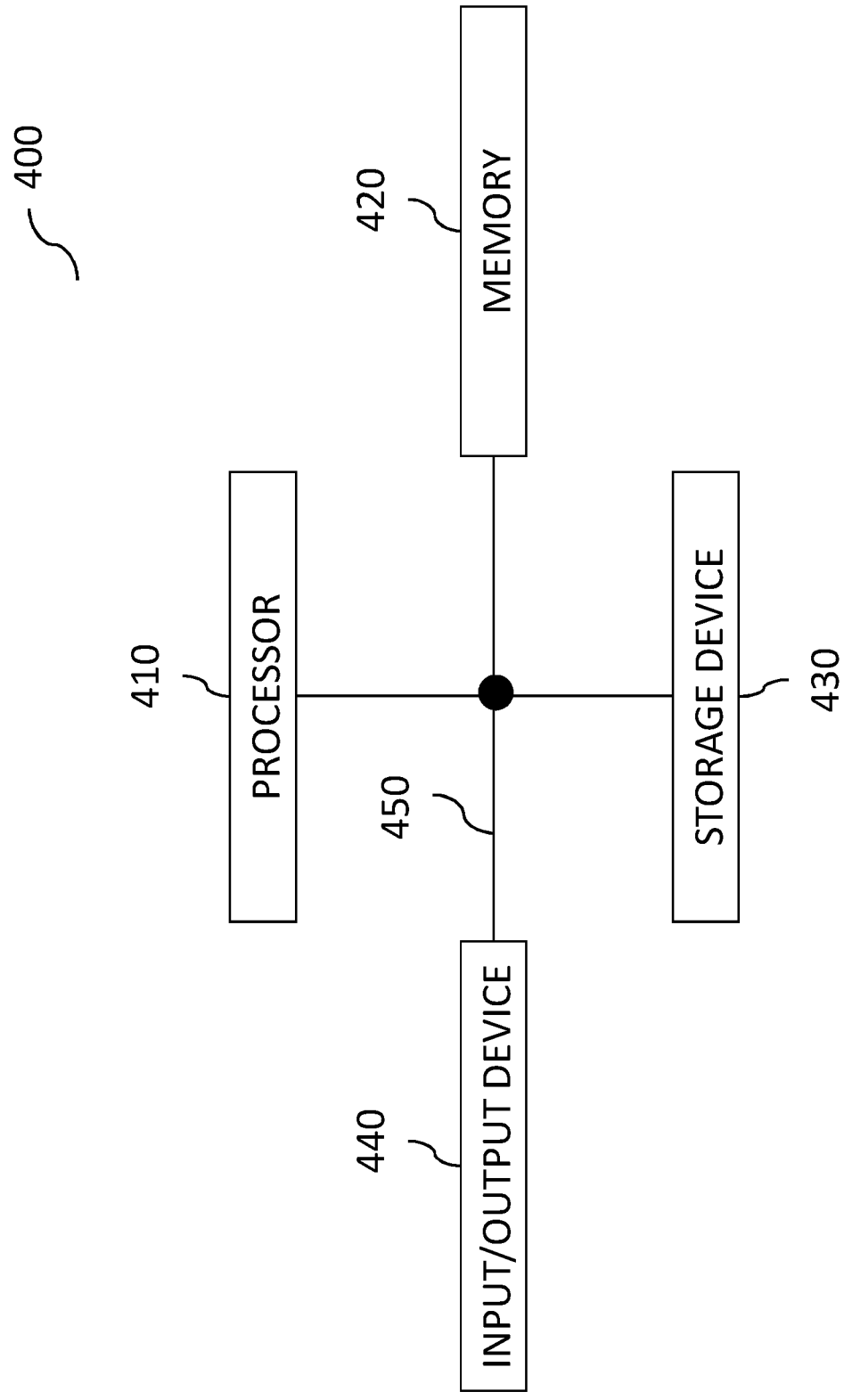
FIG. 4 illustrates an exemplary system, according to some implementations of the current subject matter.

In some implementations, the current subject matter can be configured to be implemented in a system 400, as shown in FIG. 4. The system 400 can include a processor 410, a memory 420, a storage device 430, and an input/output device 440. Each of the components 410, 420, 430 and 440 can be interconnected using a system bus 450. The processor 410 can be configured to process instructions for execution within the system 400. In some implementations, the processor 410 can be a single-threaded processor. In alternate implementations, the processor 410 can be a multi-threaded processor. The processor 410 can be further configured to process instructions stored in the memory 420 or on the storage device 430, including receiving or sending information through the input/output device 440. The memory 420 can store information within the system 400. In some implementations, the memory 420 can be a computer-readable medium. In alternate implementations, the memory 420 can be a volatile memory unit. In yet some implementations, the memory 420 can be a non-volatile memory unit. The storage device 430 can be capable of providing mass storage for the system 400. In some implementations, the storage device 430 can be a computer-readable medium. In alternate implementations, the storage device 430 can be a floppy disk device, a hard disk device, an optical disk device, a tape device, non-volatile solid state memory, or any other type of storage device. The input/output device 440 can be configured to provide input/output operations for the system 400. In some implementations, the input/output device 440 can include a keyboard and/or pointing device. In alternate implementations, the input/output device 440 can include a display unit for displaying graphical user interfaces.

Figure 5:
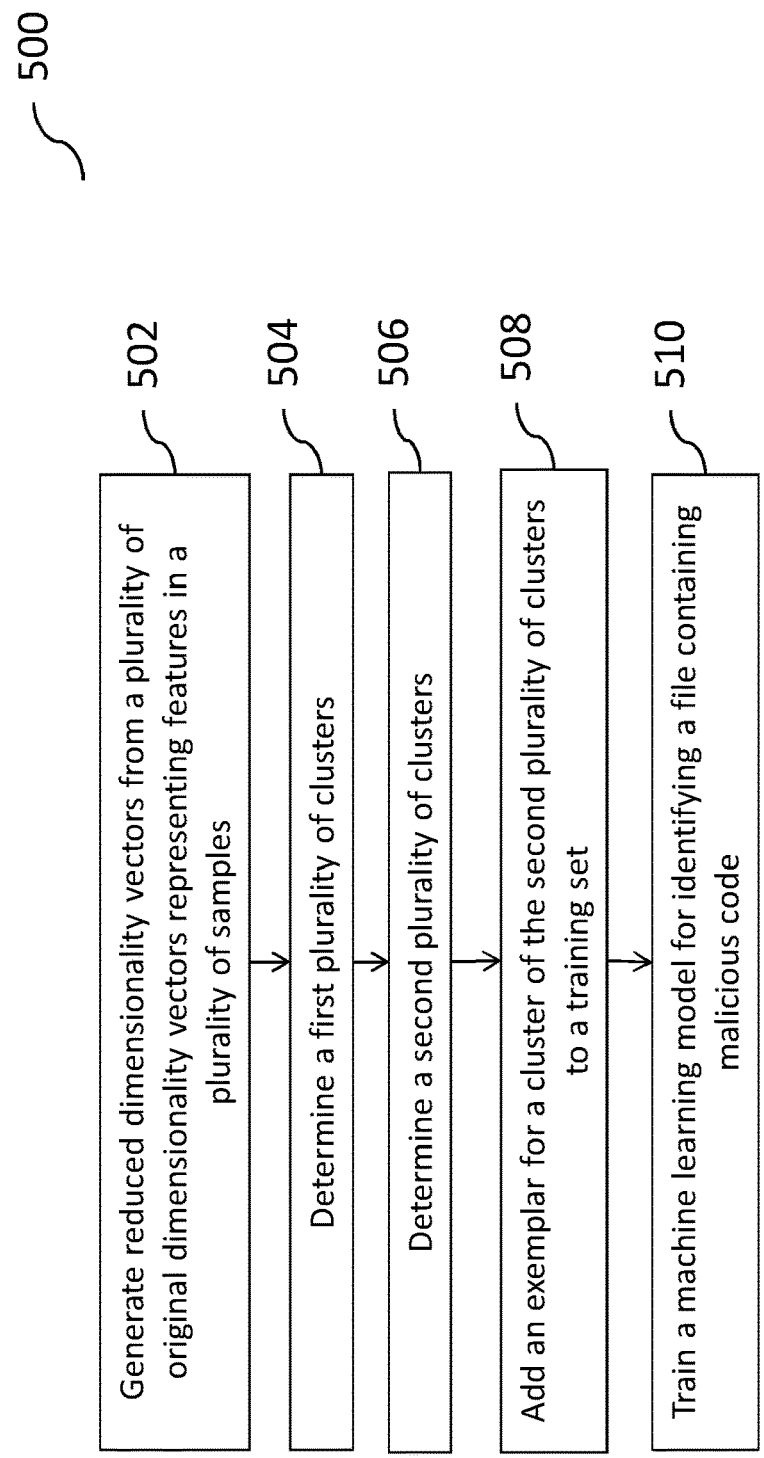
FIG. 5 illustrates an exemplary method, according to some implementations of the current subject matter.

FIG. 5 illustrates an exemplary method 500, according to some implementations of the current subject matter. At 502, reduced dimensionality vectors can be generated from a plurality of original dimensionality vectors. The original dimensionality vectors can represent features in a plurality of samples. The reduced dimensionality vectors can have a lower dimensionality than an original dimensionality of the plurality of original dimensionality vectors. At 504, a first plurality of clusters can be determined. This can include applying a first clustering algorithm to the reduced dimensionality vectors. At 506, a second plurality of clusters can be determined. This can include applying a second clustering algorithm to one or more clusters in the first plurality of clusters using the original dimensionality. At 506, an exemplar for a cluster in the second plurality of clusters can be added to a training set. At 508, a machine learning model for identifying a file containing malicious code can be trained. The training can include use of the training set.

In some implementations, the current subject matter can include one or more of the following optional elements. In some implementations, the first and second clustering algorithms can be the same.

In some implementations, the generation of the reduced dimensionality vectors can include applying a random projection to the original dimensionality vectors. The random projection can preserve at least one pairwise distance between at least two features of an original dimensionality vector. In some implementations, the random projection can approximately preserve pairwise distances between all points. For example, if any 2 points in the high dimensional space are selected and a distance between them is determined, and the points are projected to the lower-dimensional space and the distance between those two points is determined again, then that distance will be approximately the same as the originally measured distance. The random projection can have a predetermined size.

In some implementations, the addition of an exemplar can include selecting the exemplar corresponding to a sample contained in the cluster of the second plurality of clusters. The cluster in the second plurality of clusters can have a predetermined radius. The pairwise distances between features contained in the cluster of the second plurality of clusters can be less than the predetermined radius. This cluster can have a predetermined minimum number of samples. In some implementations, the pairwise distances between some points contained in the cluster in the second plurality of clusters can be greater than the predetermined radius. For example, when using DBSCAN clustering algorithm, a radius ($\varepsilon$) can be used to grow the cluster to nearby points. The final resulting cluster can be much larger than $\varepsilon$, whereby many of the pairwise distances can be larger than $\varepsilon$. For example, application of the DBSCAN clustering algorithm with $\varepsilon=1$ and min points (i.e., minimum number of points) equal to 1 or 2 to a line of 100 points, where each point is spaced 1 unit apart from the previous point can result in a cluster having all 100 points. However, the first and last points of the line will be 99 units apart, i.e., 99*$\varepsilon$. As such, two points can be in the same cluster, but can be much further than an $\varepsilon$ apart.

Further, a sample that falls outside of the cluster (e.g., an outlier) can be added as the exemplar to the training set. In some implementations, the exemplar can be selected based on a randomly selected point in each cluster. All outlier points can be selected for inclusion in the training set. In some implementations, the exemplar can be a point in each cluster that is particularly representative of that cluster (e.g., if the point is relatively close to the center of the cluster). In alternate implementations, for each cluster, a number of points proportional to the spread of the cluster can be selected as exemplar(s). For example, for a large cluster, a large number of points can be selected as exemplar(s). For a small cluster, fewer number of points can be selected.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method comprising
generating reduced dimensionality vectors from a plurality of original dimensionality vectors representing features in a plurality of samples, the reduced dimensionality vectors having lower dimensionality than an original dimensionality of the plurality of original dimensionality vectors;
first determining a first plurality of clusters, the first determining comprising first applying a first clustering algorithm to the reduced dimensionality vectors;
second determining a second plurality of clusters and a plurality of outliers not forming part of one of the second plurality of clusters, the second determining comprising second applying a second clustering algorithm to original dimensionality vectors corresponding to the reduced dimensionality vectors in the first plurality of clusters, the second plurality of clusters being smaller than the first plurality of clusters;
randomly selecting at least one exemplar from each of at least a portion of the clusters of the second plurality of clusters;
adding the randomly selected exemplars to a training set;
adding the plurality of outliers to the training set; and
training a machine learning model for identifying a file containing malicious code, the training comprising use of the training set;
wherein at least one of the generating, the first determining, the second determining, the adding, and the training is performed by at least one processor of at least one computing system.

2. The method according to claim 1, wherein the first and second clustering algorithms are same.

3. The method according to claim 1, where the generating of the reduced dimensionality vectors comprises applying a random projection to the original dimensionality vectors.

4. The method according to claim 3, wherein the random projection approximately preserves all pairwise distances between the original dimensionality vectors.

5. The method according to claim 3, wherein the random projection has a predetermined size.

6. The method according to claim 1, wherein the cluster of the second plurality of clusters has a predetermined radius, wherein pairwise distances between points contained in the cluster of the second plurality of clusters are less than the predetermined radius.

7. The method according to claim 1, wherein the cluster of the second plurality of clusters has a predetermined radius, wherein pairwise distances between some points contained in the cluster of the second plurality of clusters are greater than the predetermined radius.

8. The method according to claim 1, wherein the cluster of the second plurality of clusters has a predetermined minimum number of points.

9. A system comprising:
at least one programmable processor; and
memory storing instructions which, when executed by the at least one programmable processor, execute operations comprising:
generating reduced dimensionality vectors from a plurality of original dimensionality vectors representing features in a plurality of samples, the reduced dimensionality vectors having lower dimensionality than an original dimensionality of the plurality of original dimensionality vectors;
first determining a first plurality of clusters, the first determining comprising first applying a first clustering algorithm to the reduced dimensionality vectors;
second determining a second plurality of clusters and a plurality of outliers not forming part of one of the second plurality of clusters, the second determining comprising second applying a second clustering algorithm to original dimensionality vectors corresponding to the reduced dimensionality vectors in the first plurality of clusters, the second plurality of clusters being smaller than the first plurality of clusters;
selecting at least one exemplar from each of at least a portion of the clusters of the second plurality of clusters which correspond to a point approximately close to a center of the associated cluster in the second plurality of clusters;

adding the selected exemplars to a training set;

adding the plurality of outliers to the training set; and training a machine learning model for identifying a file containing malicious code, the training comprising use of the training set.

10. The system according to claim 9, wherein the first and second clustering algorithms are same.

11. The system according to claim 9, where the generating of the reduced dimensionality vectors comprises applying a random projection to the original dimensionality vectors.

12. The system according to claim 11, wherein the random projection approximately preserves all pairwise distances between the original dimensionality vectors.

13. The system according to claim 11, wherein the random projection has a predetermined size.

14. A computer program product comprising a non-transitory machine readable medium storing instructions that, when executed by one or more programmable processors, cause the one or more programmable processors to perform operations comprising:

generating reduced dimensionality vectors from a plurality of original dimensionality vectors representing features in a plurality of samples, the reduced dimensionality vectors having lower dimensionality than an original dimensionality of the plurality of original dimensionality vectors;

first determining a first plurality of clusters, the first determining comprising first applying a first clustering algorithm to the reduced dimensionality vectors;

second determining a second plurality of clusters, the second determining comprising second applying a second clustering algorithm to original dimensionality vectors corresponding to the reduced dimensionality vectors in the first plurality of clusters, the second plurality of clusters being smaller than the first plurality of clusters;

adding, from each cluster in the second plurality of clusters, a single exemplar to a training set which is based on a date of creation of the corresponding cluster ; and training a machine learning model for identifying a file containing malicious code, the training comprising use of the training set.

* * * * *